Dec. 1, 1964 R. E. LATHAM ETAL 3,159,302
SEALING CONNECTION INCLUDING A RIGID SEALING RING HAVING
OPPOSED, ELASTICALLY DEFLECTABLE LIPS
Filed Feb. 19, 1962

INVENTORS
JOHN D. WATTS
RAYMOND E. LATHAM
BY Cushman, Darby & Cushman
ATTORNEYS 3,159,302
SEALING CONNECTION INCLUDING A RIGID SEALING RING HAVING OPPOSED, ELASTICALLY DEFLECTABLE LIPS
Raymond E. Latham and John D. Watts, Houston, Tex., assignors to Gray Tool Company, Houston, Tex., a corporation of Texas
Filed Feb. 19, 1962, Ser. No. 173,896
1 Claim. (Cl. 220—46)

The present invention relates to a new and improved sealing arrangement for pressure vessels, pipes, and the like.

The patent to Watts et al. No. 2,766,999 discloses a metal or otherwise relatively rigid sealing ring for pipes and the like having opposed tapered lips adapted to be angularly deflected within their elastic limit into stressed sealing engagement with a cooperative sealing surface. While this sealing arrangement has enjoyed considerable success, there necessarily results a laterally outward force on the sealing ring which is balanced only by the restraining force of the adjacent conduits or the like which are joined together.

According to the present invention, there is provided a sealing arrangement for pressure vessels, conduits, and the like which embodies the principles of the Watts et al. Patent No. 2,766,999 but additionally provides a balanced sealing force by virtue of a U-shaped sealing ring wherein the opposed surfaces of the legs are cooperatively tapered and stressed so that the radial forces are balanced within the ring.

This invention contemplates the provision of a pressure vessel sealing arrangement or the like which includes a generally U-shaped sealing ring, wherein the outer surfaces are tapered towards one another from the base thereof, the ring being constructed of metal or other relatively rigid material and adapted to be deflected into stressed sealing engagement with adjacent sealing surfaces.

Further according to this invention, there is provided the combination of a pressure vessel having an outwardly tapering sealing surface at its one end, and a closure member having a cooperatively tapered opposed sealing surface, received within the access end of the pressure vessel. A U-shaped sealing ring of the character described is received within these opposed surfaces, base end outermost, and means are provided independent of the closure member for moving the sealing ring longitudinally for stressing the opposed legs and angularly deflecting the same within their elastic limit into stressed engagement with the adjacent sealing surfaces. Accordingly the ring sealing surfaces, when in their unstressed state, have a tapered slope which is a slightly smaller angle with respect to the longitudinal axis than the adjacent vessel and closure member sealing surfaces. When the ring is moved longitudinally into stressed sealing engagement, the ring legs are flexed inwardly so that their sealing surfaces are coextensive with the adjacent vessel and closure member sealing surfaces.

Further, means are provided for limiting the allowable longitudinal movement of the sealing ring so as to prevent an adverse stressing thereof. In this regard, the U-shaped ring may carry positive stops, such as extending lips and the closure means carries circumferentially spaced, independently operable set screws to move the ring longitudinally into a balanced and stressed sealing position.

These and still further objects, advantages and novel features of the present invention will become apparent in the specification and claim, taken in connection with the accompanying drawings.

Figure 2:
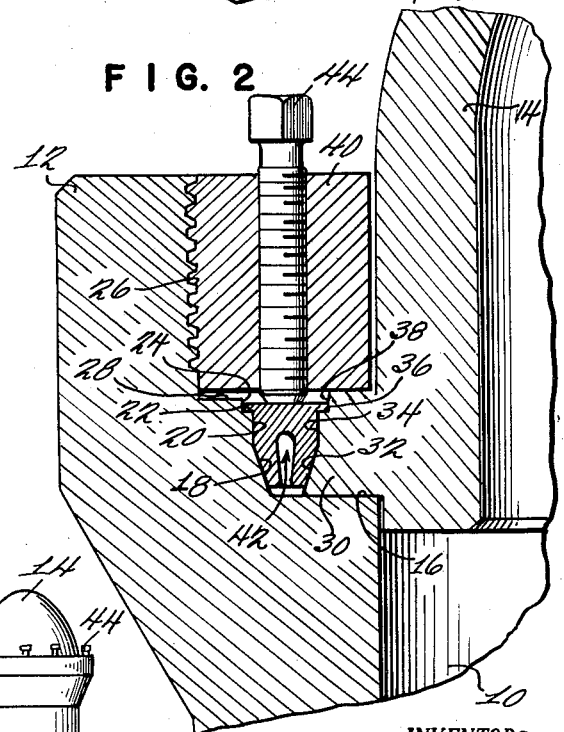
FIGURE 2 is a fragmentary elevation section view of the sealing arrangement in FIGURE 1.
Figure 1:
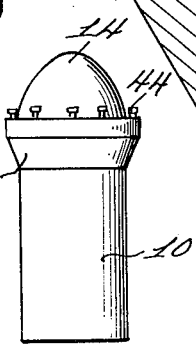
FIGURE 1 is an elevation view of a pressure vessel embodying sealing means according to this invention.

Referring now to the accompanying drawings, there is shown in FIGURES 1 and 2 a cylindrical pressure vessel 10 closed at its upper enlarged end 12 by a dome-shaped, hemispherical, or ellipsoidal closure gap 14.

Figure 3:
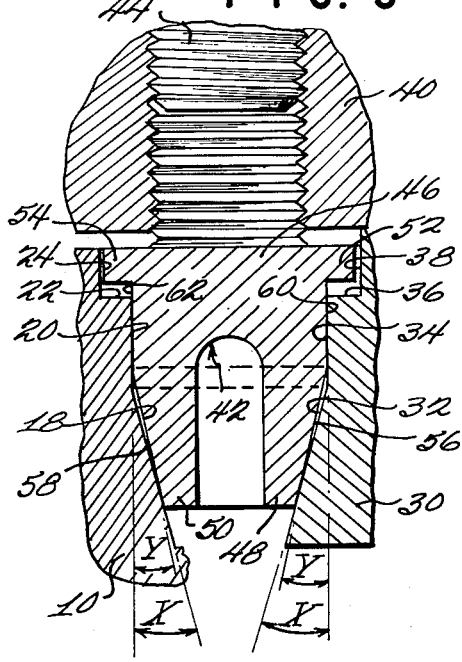
FIGURE 3 is an enlarged section view of the sealing ring in FIGURE 2 with the sealing ring in its unstressed state.

The upper interior of the vessel 10 terminates with a radially extending shoulder 16. Terminating at this shoulder 16 is an outwardly tapered, generally conical interior sealing surface 18. The outer end of this sealing surface 18 merges into an interior cylindrical surface 20, which latter surface terminates at its outer end with a radial shoulder 22, as best shown in FIGURES 2 and 3. A short cylindrical surface 24 at the outer end of the shoulder 22 defines thereby an annular recess. The end 12 of the vessel 10 is interiorly threaded at 26, and another radial shoulder 28 bridges the inner end of the threads 26 and the short cylindrical surface 24.

The closure cap 14 carries an integral flange 30 which normally rests on the shoulder 16 of the vessel 10. This flange 30 has a tapered, generally conical exterior sealing surface 32 disposed in spaced apart identically opposed relationship to the sealing surface 18. Above the surface 32 is a cylindrical surface 34 concentric with the interior cylindrical surface 20 of the vessel end 12. Likewise, an inwardly extending radial shoulder 36 is carried at the upper end of the flange 30, positioned in opposed alignment with the vessel shoulder 22. A short cylindrical surface 38 is formed at the end of the flange 30 in concentric relationship with the surface 24.

An exteriorly threaded retaining ring 40 is received in the threaded portion 26 of the vessel end 12, resting at its lower end on the top of the closure cap flange 30, but spaced slightly above the upper surface of the shoulder 28. This ensures an adequate preloading of the assembly, as will become apparent.

A sealing ring 42 of unitary, continuous hard metal or the like is carried between the opposed tapered sealing surfaces 18 and 32. This ring 42 is adapted to provide a secure and effective seal for the pressure vessel 10, upon longitudinal movement thereof by actuation of circumferentially spaced apart set screws 44 carried about the retaining ring 40, as will now be explained.

Figure 4:
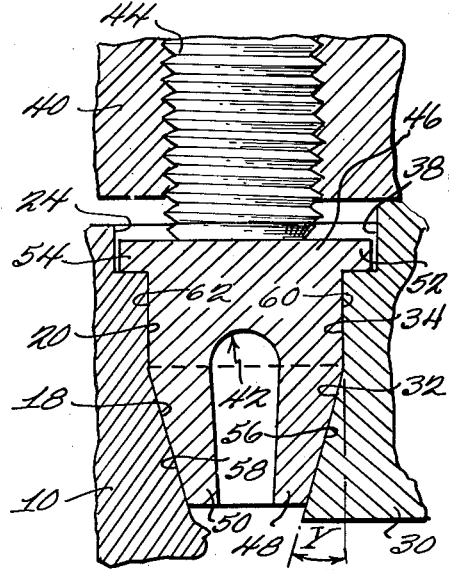
FIGURE 4 is a section view similar to FIGURE 3, but showing the sealing ring in its stressed state.

Referring now to FIGURES 3 and 4, the ring 42 is of U-shaped configuration when viewed from a plane passing through the axis thereof, defining a base portion 46 and longitudinally extending inner and outer legs 48 and 50, respectively.

The base portion 46 of the ring carries radially extending inner and outer lips 52 and 54, respectively, adapted to be received in the annular recesses defined by the cylindrical surfaces 24 and 38.

In this regard, the depth of the lip-receiving recess defined by the surfaces 24 and 38 is substantially greater than the longitudinal length of the lips 52 and 54, to allow relative longitudinal movement therebetween, as will become apparent.

The sealing surfaces 18 and 32 are each inclined towards one another with respect to the longitudinal axis of the ring 42 (and the vessel 10) an angle X, while the inner and outer legs, 48 and 50, have tapered sealing surfaces 56 and 58, respectively which surfaces are each inclined towards one another relative to the longitudinal axis an angle Y, which is less than angle X. As described in the patent to Watts et al. No. 2,766,999, the slight angular difference, X—Y, of the ring sealing surfaces 56, 58 and the adjacent vessel and closure sealing surfaces 18 and 32 provides a stressing of the ring legs 48 and 50 when the ring 42 is moved longitudinally, abutting the shoulders 22 and 36. The legs 48 and 50 thus flex towards one another within their elastic limit, maintaining a continuous circumferential seal, due to the stressed engagement of the leg surfaces 56 and 58 with the adjacent sealing surfaces 32 and 18. While the exact angle between the sealing surfaces, and the allowable longitudinal movement of the ring 42 can be varied, depending on the size of the vessel 10, the material used in forming the ring 42, the physical stress characteristics of the ring and the like, typical angular relationship of the angles X and Y are fully described in the patent to Watts et al. 2,766,999. As disclosed in this patent, the angle Y of the ring sealing surfaces 56 and 58 typically may be 14–19° with the angle increasing upon a decrease in diameter of the ring 42, while the larger angle X of the adjacent sealing surfaces 18 and 32 may be 1° larger than the angle selected for Y. The allowable movement of the ring 42 occasioned by the difference in length of the surfces 24, 38 for the lip 52, 54 is chosen so that the legs 48 and 50 will flex toward one another within their elastic limit. Additionally, the ring 42 has inner and outer cylindrical surfaces 60, 62 adjacent the lips 52 and 54 which are coextensive with the surfaces 20 and 34 when the ring 42 is stressed in sealing engagement by appropriate actuation of the set screws 44, as best shown in FIGURE 4.

By virtue of the configuration of the ring 42 and its sealing action with respect to the vessel 10 and the closure flange 30, the radial forces imparted to the ring 42 are effectively balanced and the ring is stressed by the set screws 44 independent of the closure cap 14.

Figure 5:
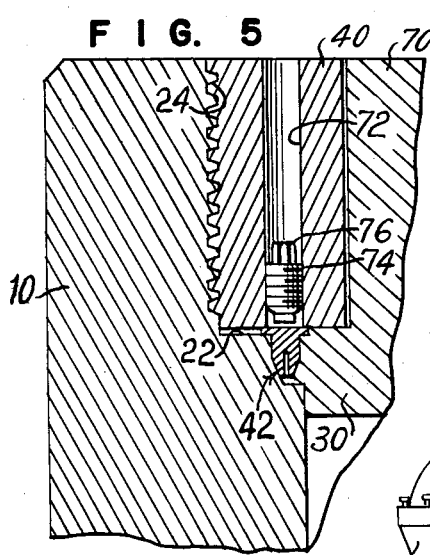
FIGURE 5 is a fragmentary elevational section view of a pressure vessel sealing means according to still another embodiment of this invention.

In FIGURE 5, the sealing ring 42 is identical in construction to the ring in FIGURES 1–3; however, the radial shoulder 22 in the vessel end 12 extends outwardly to the interior threads 24. Also, the closure cap 70 is of disklike construction and is retained in the end of the vessel 10 by a retaining ring 40 as in FIGURES 2–4. In this embodiment of the invention, the circumferentially spaced passages 72 in the ring 40 are threaded at their lower ends only, the set screws 74 being disposed wholly within the passages 72 and having a cap 76 for receiving a screw driver, Allen-head wrench, and the like.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

Structure of the character described comprising: a pressure vessel having an outwardly tapering sealing surface; closure means for said pressure vessel having a tapered sealing surface oppositely adjacent said pressure vessel sealing surface; a unitary continuous sealing ring of hard metal or the like having a generally U-shaped cross-sectional area defining a base portion and flexible inner and outer legs extending longitudinally therefrom, said legs having generally conical sealing surfaces normally tapering from said base portion at a smaller angle relative to the axis of said ring than said pressure vessel and closure sealing surfaces, said pressure vessel and closure sealing surfaces being substantially equi-angular with respect to the sealing ring axis, said inner and outer leg sealing surfaces being disposed on the interior and exterior circumferential surfaces thereof and tapering toward one another from the base portion to the opposite free ends thereof substantially equi-angularly with respect to the sealing ring axis, including laterally extending lip means carried by said base portion, said closure means and said vessel providing a recess for slidably receiving said lip means, said recess being of a depth relative to the longitudinal thickness of said lip means to limit the movement of said sealing ring within the elastic limit of said inner and outer legs; and means carried by said closure member for independently moving said ring longitudinally to a sealing position wherein said legs are flexed in coextensive, stressed sealing engagement along their sealing surfaces with said pressure vessel and closure sealing surfaces, the ring moving means including circumferentially spaced set screws operative to engage said sealing ring base portion, said sealing ring being received between said pressure vessel and closure sealing surfaces with said base portion outermost.

References Cited in the file of this patent

UNITED STATES PATENTS

| | | |
|---|---|---|
| 881,060 | Cook | Mar. 3, 1908 |
| 924,039 | Clark | June 8, 1909 |
| 1,567,813 | Oleson | Dec. 29, 1925 |
| 2,226,495 | Jacocks | Dec. 24, 1940 |
| 2,747,900 | Smith | May 29, 1956 |
| 2,843,155 | Risley et al. | July 15, 1958 |
| 3,046,026 | Burrows | July 24, 1962 |